United States Patent
Wang et al.

(10) Patent No.: US 11,886,051 B2
(45) Date of Patent: Jan. 30, 2024

(54) DISPLAY DEVICE

(71) Applicants: Beijing BOE Optoelectronics Technology Co., Ltd., Beijing (CN); BOE Technology Group Co., Ltd., Beijing (CN)

(72) Inventors: Chenru Wang, Beijing (CN); Yali Liu, Beijing (CN); Ruijun Dong, Beijing (CN); Ke Li, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 406 days.

(21) Appl. No.: 17/287,446

(22) PCT Filed: Sep. 18, 2020

(86) PCT No.: PCT/CN2020/116178
§ 371 (c)(1),
(2) Date: Apr. 21, 2021

(87) PCT Pub. No.: WO2021/114798
PCT Pub. Date: Jun. 17, 2021

(65) Prior Publication Data
US 2022/0308368 A1    Sep. 29, 2022

(30) Foreign Application Priority Data

Dec. 9, 2019  (CN) .......................... 201911249880.5

(51) Int. Cl.
*G02F 1/01*   (2006.01)
*G02B 6/42*   (2006.01)
*G02B 30/10*  (2020.01)

(52) U.S. Cl.
CPC ............ *G02F 1/011* (2013.01); *G02B 6/4206* (2013.01); *G02B 30/10* (2020.01)

(58) Field of Classification Search
CPC ........ G02F 1/011; G02B 6/4206; G02B 30/10
(Continued)

(56) References Cited

U.S. PATENT DOCUMENTS

2005/0259935 A1*  11/2005  Hamada .................. G02B 6/138
                                                                    385/129
2015/0260995 A1    9/2015  Mukawa
(Continued)

FOREIGN PATENT DOCUMENTS

CN       101846799 A      9/2010
CN       203465469 U      3/2014
(Continued)

OTHER PUBLICATIONS

CN201911249880.5 First Office Action.
PCT/CN2020/116178 International Search Report.

*Primary Examiner* — Jerry M Blevins
(74) *Attorney, Agent, or Firm* — IPro, PLLC

(57) ABSTRACT

A display device includes: an optical waveguide comprising an optical waveguide body and a light outputting section disposed on the optical waveguide body; M lens assemblies disposed adjacent to an end of the optical waveguide body, wherein at least two lens assemblies of the M lens assemblies have different focal lengths, and M is a natural number greater than one; and M display screens corresponding to the M lens assemblies in one-to-one correspondence, each of the M display screens configured to emit light with image information through a corresponding lens assembly to the optical waveguide body for transmission; wherein the light outputting section is configured to output the light from the M display screens out of the optical waveguide body for imaging, the light from the M display screens form M (Continued)

images, respectively, and at least two images of the M images have different image distances.

12 Claims, 2 Drawing Sheets

(58) Field of Classification Search
USPC .......................................................... 385/33
See application file for complete search history.

(56) References Cited

U.S. PATENT DOCUMENTS

2018/0074340 A1\* 3/2018 Robbins ............. G02B 27/0172
2019/0129168 A1   5/2019 Tan
2020/0158944 A1   5/2020 Wang et al.
2021/0018760 A1\* 1/2021 Wang .................... G02B 30/25

FOREIGN PATENT DOCUMENTS

| | | | |
|---|---|---|---|
| CN | 104932102 | A | 9/2015 |
| CN | 105652448 | A | 6/2016 |
| CN | 107329256 | A | 11/2017 |
| CN | 107728319 | A | 2/2018 |
| CN | 109188700 | A | 1/2019 |
| CN | 110297331 | A | 10/2019 |
| CN | 110927969 | A | 3/2020 |
| CN | 111983811 | A | 11/2020 |
| JP | H02186319 | A | 7/1990 |
| WO | 2018067828 | A1 | 4/2018 |

\* cited by examiner

DISPLAY DEVICE

CROSS REFERENCE TO RELATED APPLICATIONS

The present application is a US national phase of a PCT application under PCT/CN2020/116178, which is filed on Sep. 18, 2020 and claims the priority of Chinese patent application CN 201911249880.5 entitled with "DISPLAY DEVICE" and filed with National Intellectual Property Administration, P.R.C. on Dec. 9, 2019, contents of which is incorporated herein by reference in entirety.

TECHNICAL FIELD

The present disclosure relates to the field of display technology, and more particularly to a display device.

BACKGROUND

When we observe a three-dimensional object, a three-dimensional display image may be formed in the brain. The principle is that the left and right eyes respectively see a picture of the same scene from different perspectives, and these two pictures cause parallax between the left and right eyes. The brain can fuse two images from two perspectives into a stereoscopic image.

During the observing process, the two eyes adjust their respective refractive power through their respective crystalline lens, so that an object is imaged on a virtual image plane of the retina. In a case that the brain fuses the images, due to depth difference between the three-dimensional object and the virtual image plane, the eyes are required to perform vergence accommodation to adapt to the depth difference. Based on the muscle memory of the human eyes, there is a certain correlation between the refractive power adjustment and the vergence accommodation.

SUMMARY

The disclosure provides a display device including: an optical waveguide, including an optical waveguide body and a light outputting section disposed on the optical waveguide body; M lens assemblies disposed adjacent to an end of the optical waveguide body, at least two lens assemblies of the M lens assemblies having different focal lengths, M being a nature number greater than 1; and M display screens corresponding to the M lens assemblies in one-to-one correspondence, and each of the M display screens configured to emit light with image information to the optical waveguide body through the corresponding lens for transmission, wherein the light outputting section is configured to output the light that is emitted from the M display screens out of the optical waveguide body for imaging, the light from the M display screens respectively form M images, and at least two images of the M images have different image distances.

In some embodiments of the present disclosure, the optical waveguide further includes M coupling sections, the M coupling sections are disposed at the end of the optical waveguide body; the M lens assemblies correspond to the M coupling sections in one-to-one correspondence, each of the M lens assemblies is configured to transmit light from a corresponding display screen to a corresponding coupling section, and each of the M coupling sections is configured to couple light from a corresponding display screen into the optical waveguide body at a corresponding incident angle for transmission.

In some embodiments of the present disclosure, each of the M coupling sections includes an incident surface, and at least one lens assembly of the M lens assemblies is disposed between the incident surface of its corresponding coupling section and its corresponding display screen.

In some embodiments of the present disclosure, an orthographic projection of at least one of the display screens on the incident surface of its corresponding coupling section is within an orthographic projection of its corresponding lens assembly on the incident surface of the corresponding coupling section.

In some embodiments of the present disclosure, at least one display screen of the M display screens is disposed parallel to an incident surface of its corresponding coupling sections.

In some embodiments of the present disclosure, at least one coupling section of the M coupling sections includes a reflective surface and an exit surface, the reflective surface is configured to reflect light that is emitted from its corresponding display screen and passes through the incident surface to the exit surface, the light that is emitted from its corresponding display screen enters the optical waveguide body after exiting the exit surface.

In some embodiments of the present disclosure, the light outputting section includes N optical film layers disposed parallel to each other, the N optical film layers are transreflective film layers, wherein N is a positive integer; and the N optical film layers are arranged obliquely with respect to an extending direction of the optical waveguide body; and each of the N optical film layers is configured to reflect a portion of light from each of the M display screens, such that the portion of light exits the optical waveguide body through the light outputting section.

In some embodiments of the present disclosure, intensities of portions of light emitted from a same display screen, which are reflected by the N optical film layers respectively, are substantially the same.

In some embodiments of the present disclosure, the light outputting section includes L optical film layers and a first reflective film layer, the L optical film layers and the first reflective film layer are disposed parallel to each other, and L is a positive integer, the first reflective film layer is disposed on a side of the L optical film layers away from the end; the L optical film layers are transreflective film layers; the optical film layer and the first reflective film layer are arranged obliquely with respect to an extension direction of the optical waveguide body, and each of the L optical film layers is configured to reflect a portion of light from each of the M display screens, such that the portion of light exits the optical waveguide through the light outputting section, the first reflective film layer is configured to reflect a portion of light that is emitted from the M display screens and passes through the L optical film layers such that the portion of the light that is emitted from the M display screens and passes through the L optical film layers exits the optical waveguide body through the light outputting section.

In some embodiments of the present disclosure, intensities of portions of the light that is emitted from a same display screen and reflected by the L optical film layers respectively and by the first reflective layer are substantially the same.

In some embodiments of the present disclosure, the light outputting section comprises a second reflective film layer; and the second reflective film layer is arranged obliquely with respect to an extension direction of the optical waveguide body; the second reflective film layer is configured to reflect light from each of the M display screens so that the light reflected by the second reflective layers exits the optical waveguide body through the light outputting section.

In some embodiments of the present disclosure, the optical waveguide body has a shape of sheet.

In some embodiments of the present disclosure, the light with image information is transmitted through total reflection in the optical waveguide body from the end toward the light outputting section.

BRIEF DESCRIPTION OF THE DRAWINGS

The drawings here are incorporated into the specification and constitute a part of the specification, illustrate embodiments in accordance with the disclosure, and are used together with the specification to explain the principle of the disclosure.

DETAILED DESCRIPTION OF THE EMBODIMENTS

Exemplary embodiments will be described in detail hereinafter, and examples thereof are illustrated in the accompanying drawings. When the following description refers to the drawings, unless otherwise indicated, the same reference signs in different drawings designate the same or similar elements. The implementation manners described in the following exemplary embodiments do not represent all implementation manners consistent with the present disclosure. Rather, they are merely examples of devices and methods in consistence with some aspects of the present disclosure as defined in the appended claims.

In display technologies related to VR (Virtual Reality, virtual reality) or AR (Augmented Reality, augmented reality), a single-focus optical scheme is typically adopted. The inventors found that, in related arts, the image presented by the single-focus optical scheme has a constant image distance to the human eye, so that it is not necessary for the observer to adjust refractive power when observing the image. However, due to conflict between the convergent rotation of the human eyes and the constant refractive power (vergence-accommodation conflict), eye fatigue or dizziness occurs to the observer during watching dynamic 3D images for a long time.

In order to overcome the defects in the related arts, the present disclosure provides a display device including: an optical waveguide, M lens assemblies, and M display screens, where M is a natural number greater than 1. The optical waveguide includes an optical waveguide body and a light outputting portion disposed on the optical waveguide body; the M lens assemblies is disposed adjacent to an end of the optical waveguide body, and at least two lens assemblies of the M lens assemblies have different focal lengths; the M display screens correspond to the M lens assemblies in one-to-one correspondence, and each of the M display screens is configured to emit light with image information to the optical waveguide body through a corresponding lens assembly for transmission. The light outputting section is configured to output the light from the M display screens out of the optical waveguide body for imaging, and the light from the M display screens forms M images respectively, and at least two images of the M images have different image distances. Thus, the observer may see images with different depths of field, which avoids vergence-accommodation conflict caused by only viewing images with the same image distance, and can alleviate eye fatigue and dizziness. The image distance in the present disclosure refers to a distance from the observer's glasses to an image formed by light which is emitted from the display screens and output through the light outputting section out of the light waveguide body.

Figure 1:
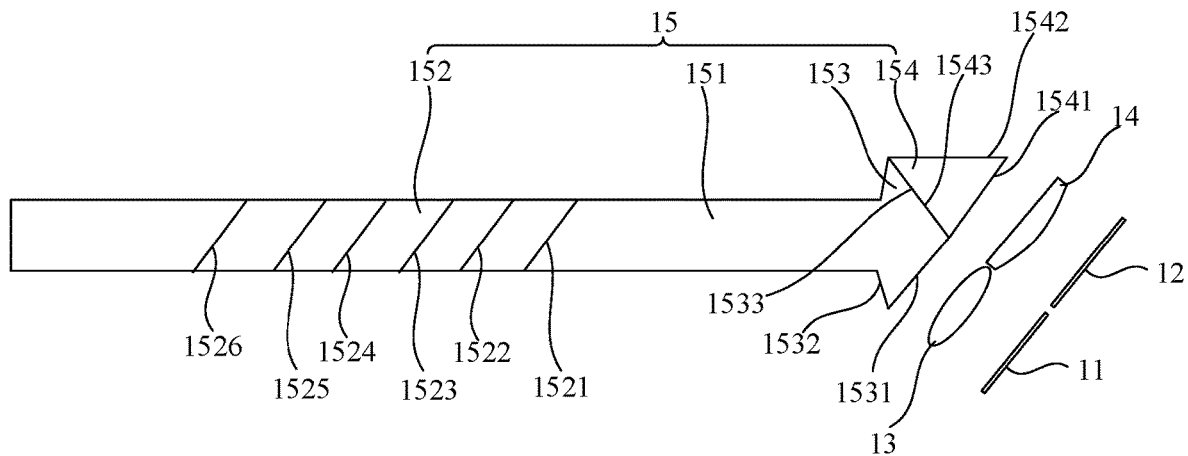
FIG. 1 is a schematic structural view illustrating a display device according to an embodiment of the present disclosure.

FIG. 1 is a display device according to an embodiment of the present disclosure. The display device includes: M display screens 11, 12, M lens assemblies 13, 14 and an optical waveguide 15. At least two lens assemblies of the M lens assemblies 13, 14 have different focal lengths. M is a natural number greater than 1. For example, M may be 2, 3 or other natural numbers. In this embodiment, description is set forth by taking M being 2 as an example. The optical waveguide 15 includes an optical waveguide body 151 and a light outputting section 152 disposed on the optical waveguide body 151.

The M display screens 11 and 12 correspond to the M lens assemblies 13 and 14 in one-to-one correspondence. The lens assemblies 13 and 14 are configured to transmit light from their corresponding display screens 11 and 12 to the optical waveguide body 151 for transmission. In some embodiments of the present disclosure, light from the M display screens 11 and 12 are incident to the optical waveguide body 151 substantially parallel to each other. In some embodiments of the present disclosure, the light from the M display screens 11, 12 is totally reflected and transmitted in the optical waveguide body 151, that is, the light from the M display screens 11, 12 is totally reflected at the inner wall of the optical waveguide body 151, and is transmitted toward to the light outputting section 152 from an end of the optical waveguide body 151 adjacent to the M lens assemblies.

The light outputting section 152 is configured to output the light from the M display screens 11 and 12 out of the optical waveguide body 151 to form images, the light from one display screen forms one image, and the light from the M display screens forms M images, at least two images of the M images have different image distances.

In the embodiment, the M lens assemblies are arranged to correspond to the M display screens in one-to-one correspondence, and at least two lens assemblies of the M lens assemblies have different focal lengths, thus at least two images of the M images formed by the light from the M display screens have different image distances. In a case of images being displayed on the M display screens, the observer can watch images with different image distances, which avoid vergence-accommodation conflict caused by only viewing images with a same image distance, thereby alleviating eye fatigue and dizziness.

In this embodiment, multiple depths of field display can be realized, thereby alleviating eye fatigue and dizziness. In this embodiment, the light from multiple display screens can further be transmitted in the optical waveguide to achieve multi-channel multiplexing, which can reduce the cost, reduce the display device volume, and make the display device lighter, thinner, and more portable.

Figure 2:
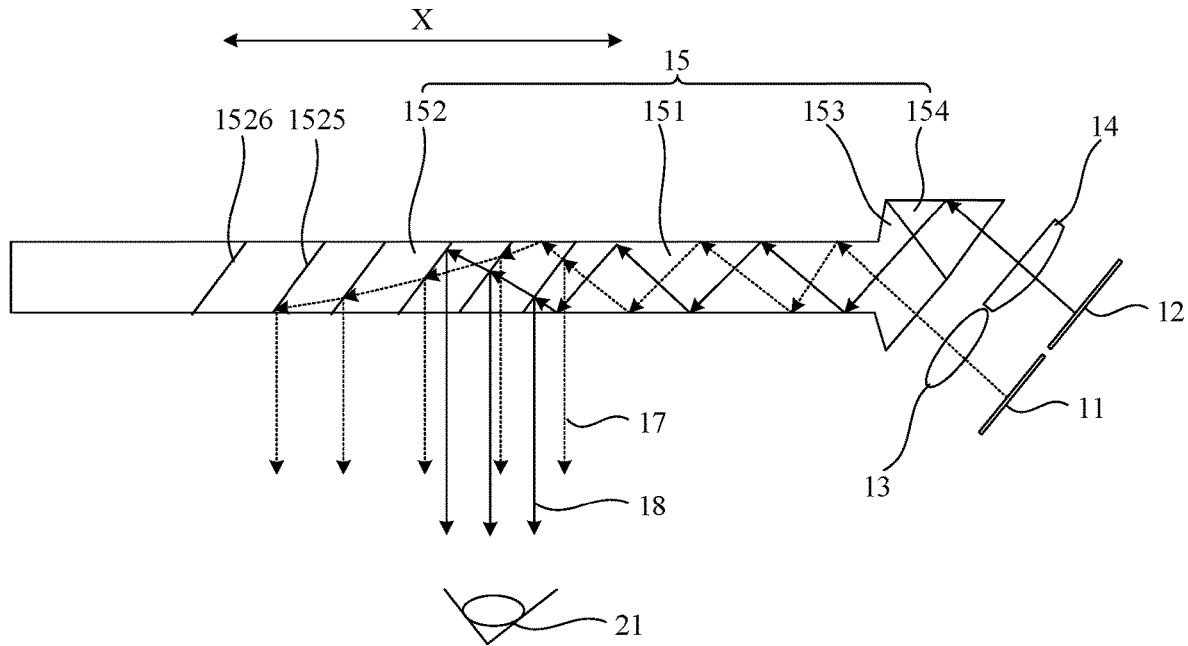
FIG. 2 is a schematic view illustrating a light path according to an embodiment of the present disclosure.

In this embodiment, M is 2. In a case that M is 2, the display device includes a display screen 11, a display screen 12, a lens assembly 13, a lens assembly 14 and an optical waveguide 15. The display screen 11 corresponds to the lens assembly 13, and the display screen 12 corresponds to the lens assembly 14. As illustrated in FIG. 2, the lens assembly 13 is configured to transmit light 17 from the display screen 11 to the optical waveguide body 151 for transmission, for example, transmission toward to a light outputting section 152 from an end of the optical waveguide body 151 adjacent to the M lens assemblies 13, 14 through total reflection in the optical waveguide body 151. The lens assembly 14 is configured to transmit light 18 from the display screen 12 to the optical waveguide body 151 for transmission, for example, toward to a light outputting section 152 from an end of the optical waveguide body 151 adjacent to the M lens assemblies 13, 14 through total reflection in the optical waveguide body 151. An incident angle at which the light 17 from the display screen 11 enters the optical waveguide body 151 and an incident angle at which the light 18 from the display screen 12 enters the optical waveguide body 151 may be same or different.

The light outputting section 152 is configured to output the light 17 from the display screen 11 out of the optical waveguide body 151 for imaging, and the light outputting section 152 is further configured to output the light 18 from the display screen 12 out of the optical waveguide body 151 for imaging. The light 17 from the display screen 11 forms one image, and the light 18 from the display screen 12 forms another image. The light from the display screens 11 and 12 forms two images, and the two images have different image distances, that is, the distances between the two images and the glasses of the observer are different. In a case that images are displayed on the display screens 11 and 12, the light 17 from the display screen 11 enters the human eye 21 of the observer, the observer can see the image displayed on the display screen 11, and the light 18 from the display screen 12 enters the human eye 21 of the observer 21, and the observer can see the image displayed on the display screen 12. In a case that images are displayed on the display screens 11 and 12, the observer can see two images with different image distances, which avoids vergence-accommodation conflict caused by only viewing images with the same image distance, thereby alleviating eye fatigue and dizziness.

In some embodiments of the present disclosure, a refractive index of the lens assembly 13 and a refractive index of the lens assembly 14 may be different.

In some embodiments of the present disclosure, a surface profile of the lens assembly 13 and a surface profile of the lens assembly 14 may be different. For example, the lens assembly 13 may be a biconvex lens, and the lens assembly 14 may be a plano-convex lens.

In some embodiments of the present disclosure, the lens assembly 13 may magnify the image displayed on the display screen 11 by 31 times, and the lens assembly 14 may magnify the image displayed on the display screen 12 by J2 times. B1 and J2 may be same or different.

In some embodiments of the present disclosure, the lens assembly 13 may be a lens group or a single lens. The lens assembly 14 may be a lens group or a single lens.

In some embodiments of the present disclosure, the lens assembly 13 may be a liquid crystal lens or a liquid lens. The lens assembly 14 may be a liquid crystal lens or a liquid lens.

In some embodiments of the present disclosure, the display screen 11 may be a liquid crystal display (Liquid Crystal Display, LCD), or the display screen 11 may be an organic light-emitting diode (Organic Light-Emitting Diode, OLED) display screen, or the display screen 11 may be a micro OELD display screen, or the display screen 11 may be a mini LED display screen, or the display screen 11 may be a Digital Light Processing (DLP) display screen, or the display screen 11 may be a Liquid Crystal on Silicon (LCOS) display screen.

In some embodiments of the present disclosure, the display screen 12 may be a liquid crystal display, an OLED display screen, a micro OELD display screen, a mini LED display screen, a DLP display screen or an LCOS display screen.

In some embodiments of the present disclosure, the display screen 11 may be a non-flexible display screen or a flexible display screen.

In some embodiments of the present disclosure, the display screen 12 may be a non-flexible display screen or a flexible display screen.

In some embodiments of the present disclosure, the light from the display screens 11 to 12 may be totally reflected and transmitted in the optical waveguide 15 without loss, thereby reducing the loss of light energy.

In this embodiment, M is 2. As illustrated in FIG. 1, based on the display device according to the above-mentioned embodiments, the optical waveguide 15 further includes a coupling section 153 and a coupling section 154. The coupling section 153 and the coupling section 154 are disposed adjacent to an end of the optical waveguide body 151, and the light outputting section 152 is disposed on the optical waveguide body 151 and is separated from the end of the optical waveguide body 151 by a predetermined distance. The end of the optical waveguide body 151 is disposed close to the lens assembly 13 and the lens assembly 14.

The lens assembly 13 corresponds to the coupling section 153, and the lens assembly 14 corresponds to the coupling section 154. The lens assembly 13 is configured to transmit the light 17 from the display screen 11 to the coupling section 153, and the lens assembly 14 is configured to transmit the light 18 from the display screen 12 to the coupling section 154.

The coupling section 153 is configured to couple the light 17 from the display screen 11 into the optical waveguide body 151 at a corresponding incident angle for transmission, and the coupling section 154 is configured to couple the light 18 from the display screen 12 into the optical waveguide body 151 at a corresponding incident angle for transmission.

In this embodiment, the coupling section 153 may be, for example, a prism, and includes an incident surface 1531. The lens assembly 13 is disposed between the incident surface 1531 and the display screen 11. An orthographic projection of the display screen 11 on the incident surface 1531 of the coupling section 153 is within an orthographic projection of the lens assembly 13 on the incident surface 1531 of the coupling section 153. The coupling section 154 may be, for example, a prism and includes an incident surface 1541. The lens assembly 14 is disposed between the incident surface 1541 and the display screen 12. An orthographic projection of the display screen 12 on the light-incident surface 1541 of the coupling section 154 is within an orthographic projection of the lens assembly 14 on the incident surface 1541 of the coupling section 154. In this way, it is ensured that the light 17 from the display screen 11 may pass through the lens assembly 13 as much as possible, and the light 18 from the display screen 12 may pass through the lens assembly 14 as much as possible.

In this embodiment, the coupling section 153 further includes a light-emitting surface 1532 and a transparent surface 1533. As illustrated in FIGS. 1 and 2, the light 17 from the display screen 11 enters the coupling section 153 through the incident surface 1531 of the coupling section 153, and then, is coupled into the optical waveguide body 151 through the light-emitting surface 1532 of the coupling section 153 for transmission. The coupling section 154 further includes a reflective surface and an exit surface. The reflective surface is configured to directly or indirectly reflect the light, which is emitted from the corresponding display screen and passes through the light-incident surface, to the exit surface, and the light from the corresponding display screen enters the optical waveguide body 151 after exiting from the exit surface. For example, the coupling section 154 includes an incident surface 1541, a reflective surface 1542, and an exit surface 1543. The reflective surface 1542 is configured to reflect the light 18, which is emitted from the display screen 12 and passes through the incident surface 1541, to the exit surface 1543, so that the light 18 from the display screen 12 exits the exit surface 1543. In some embodiments of the present disclosure, the transparent surface 1533 of the coupling section 153 is bonded to the light-emitting surface 1543 of the coupling section 154. The light 18 from the display screen 12 enters the coupling section 153 through the transparent surface 1533 after exiting from the exit surface 1543, and then enters the optical waveguide body 151 through the light-emitting surface 1532 of the coupling section 153.

In the embodiment, material of the optical waveguide 15 may be glass or plastic, and the reflective surface 1542 may be obtained by coating a reflective film layer.

In some embodiments of the present disclosure, as illustrated in FIGS. 1 and 2, based on the display device according to the above embodiments, the light outputting section 152 includes N optical film layers 1521-1526, and the N optical film layers 1521-1526 are disposed parallel to each other, wherein N is a positive integer. For example, N is 1, 2, 3 or other positive integers. In this embodiment, N is 6.

In this embodiment, the optical film layers 1521-1526 are transreflective film layers, and the optical waveguide body 151 has a shape of sheet. The optical film layers 1521-1526 are arranged obliquely with respect to a long side of the optical waveguide body 151, and the optical film layers 1521-1526 may be arranged regularly. The long side of the optical waveguide body 151 extends along a direction X in which the optical waveguide body 151 extends. The optical film layers 1521-1526 are respectively configured to reflect a portion of the light from each display screen and transmit another portion of the light from each display screen. The portion of light reflected by the optical film layers 1521-1526 exits the optical waveguide body 151. An exit direction of the light exiting the optical waveguide body 151 may be perpendicular to the optical waveguide body 151, as illustrated in FIG. 2.

In this embodiment, intensities of portions of the light from one display screen which are reflected by the respective optical film layer 1521-1526 are substantially the same. For example, for the light from one display screen, intensities of portions of light reflected by the respective film layers 1521-1526 are substantially the same. For example, for the light 17 from the display screen 11, intensity of a portion of the light from the display screen 11 reflected by the optical film layer 1521, intensity of a portion of light reflected by the optical film layer 1522, intensity of a portion of the light from the display screen 11 reflected by the optical film layer 1523, intensity of a portion of the light from the display screen 11 reflected by the optical film layer 1524, and intensity of a portion of the light from the display screen 11 reflected by the optical film layer 1525 and intensity of a portion of the light from the display screen 11 reflected by the optical film layer 1526 are substantially the same. In other words, intensities of respective portions of light from the display screen 11 reflected by the optical film layers 1521-1526 are same. In this way, for the images displayed on one display screen, the display effects of the images viewed by the observer at various positions are the same.

For the light 17 from the display screen 11, assuming that the reflectance of the optical film layer 1521 is R1, the reflectance of the optical film layer 1522 is R2, the reflectance of the optical film layer 1523 is R3, and the reflectance of the optical film layer 1524 is R4, the reflectance of the optical film layer 1525 is R5, the reflectance of the optical film layer 1526 is R6, and intensity of the light 17 which is emitted from the display screen 11 and is incident on the optical film layer 1521 is, for example, 1, intensities of respective portions of the light reflected by the optical layer films 1521-1526 are illustrated in Table 1 below, wherein, R1=R2*(1-R1)=R3*(1-R2)*(1-R1)=R4*(1-R3)*(1-R2)*(1-R1)=R5*(1-R4)*(1-R3)*(1-R2)*(1-R1)=R6*(1-R5)*(1-R4)*(1-R3)*(1-R2)*(1-R1).

TABLE 1

| Optical film layer | Intensity of portion of light reflected |
| --- | --- |
| Optical film layer 1521 | R1 |
| Optical film layer 1522 | R2*(1-R1) |
| Optical film layer 1523 | R3*(1-R2)*(1-R1) |
| Optical film layer 1524 | R4*(1-R3)*(1-R2)*(1-R1) |
| Optical film layer 1525 | R5*(1-R4)*(1-R3)*(1-R2)*(1-R1) |
| Optical film layer 1526 | R6*(1-R5)*(1-R4)*(1-R3)*(1-R2)*(1-R1) |

Figure 3:
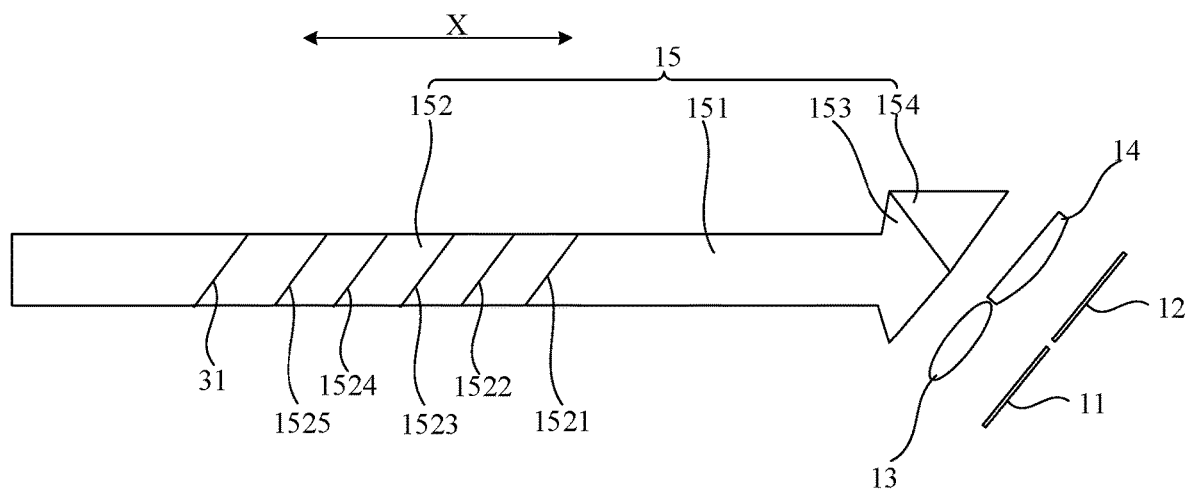
FIG. 3 is a schematic structural view illustrating a display device according to an embodiment of the present disclosure.

The embodiment of the present disclosure further provides another display device. In this embodiment, M is 2. As illustrated in FIG. 3, in the embodiment, a light outputting section 152 includes L optical film layers 1521-1525 and a first reflective film layer 31, and the L optical film layers 1521-1525 and the first reflective film layer 31 are disposed parallel to each other, and L is a positive integer. For example, L is 1, 2, 3 or other natural numbers. In this embodiment, L is 5.

The optical film layers 1521-1525 are disposed closer to the lens assembly 13 and the lens assembly 14 with respect to the first reflective film layer 31. The first reflective film layer 31 is located on a side of the optical film layers 1521-1525 away from the lens assembly 13 and the lens assembly 14. The optical film layers 1521 to 1525 are transreflective film layers, and the optical waveguide body 151 has a shape of sheet. The optical film layers 1521-1525 and the first reflective film layer 31 are disposed obliquely with respect to a long side of the optical waveguide body 151, and the optical film layers 1521-1525 and the first reflective film layer 31 can be arranged regularly. The long side of the optical waveguide body 151 extends in a direction X in which the optical waveguide body 151 extends.

The optical film layers 1521-1525 are respectively configured to reflect a portion of the light from each display screen and transmit another portion of the light from the display screen. The first reflective film layer 31 is configured to reflect the portion of the light which is emitted from each display screen and transmitted through the optical film layers 1521-1525. The light reflected by the optical film layers 1521-1525 and the light reflected by the first reflective film layer 31 exits the optical waveguide body 151. A direction of the light exiting the optical waveguide body 151 may be perpendicular to the optical waveguide body 151.

In this embodiment, intensities of portions of light that is emitted from one display screen and reflected by the respective optical film layers 1521-1525 and by the reflective film layer 31 are substantially the same.

For example, for light from one display screen, intensities of portions of light that is emitted from one display screen and reflected by the respective optical film layers 1521 to 1525 and intensity of light that is emitted from the one display screen and is reflected by the reflective film layer 31 are substantially the same. For example, for the light 17 from the display screen 11, intensity of a portion of the light 17 that reflected by the optical film layer 1521, intensity of a portion of the light 17 that is reflected by the optical film layer 1522, intensity of a portion of the light 17 that is reflected by the optical film layer 1523, intensity of a portion of the light that is reflected by the optical film layer 1524, intensity of a portion of the light 17 that is reflected by the optical film layer 1525, and intensity of a portion of the light 17 that is reflected by the first reflective layer film 31 are the same. In other words, for the light 17 from the display screen 11, intensities of the respective portions of the light 17 that are respectively reflected by the optical layer films 1521-1525 and the first reflective film layer 31 are the same. In this way, for the images displayed on the display screen, the display effects of the images viewed by the observer at various positions are the same.

Figure 4:
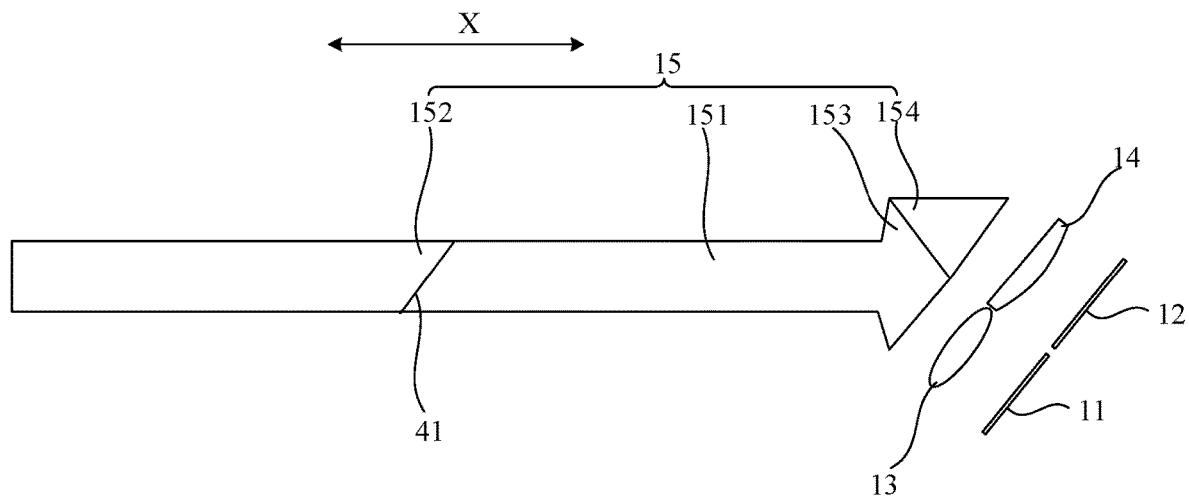
FIG. 4 is a schematic structural view illustrating a display device according to an embodiment of the present disclosure.

The embodiment of the present disclosure further provides another display device. In this embodiment, M is 2. As illustrated in FIG. 4, in the embodiment, the light outputting section 152 includes a second reflective film layer 41, and the optical waveguide body 151 has a shape of sheet. The second reflective film layer 41 is arranged obliquely with respect to a long side of the optical waveguide body 151, and the long side of the optical waveguide body 151 extends along a direction X in which the optical waveguide body 151 extends. The second reflective film layer 41 is configured to reflect light from the display screen, and the light reflected by the second reflective film layer 41 exits the optical waveguide body 151. A direction of the light exiting from the optical waveguide body 151 may be perpendicular to the optical waveguide body 151.

For example, for the light 17 from the display screen 11, the second reflective film layer 41 is configured to reflect the light 17 from the display screen 11, and the light reflected by the second reflective film layer 41 exits the optical waveguide body 151. After the light exiting the optical waveguide body 151 enters the eyes of the observer, the observer can see the image displayed on the display screen 11.

The display device according to the present disclosure may be a virtual reality display device or an augmented reality display device.

In the embodiment of the present disclosure, the M lens assemblies are arranged to correspond to the M display screens in a one-to-one correspondence, wherein at least two lens assemblies of the M lens assemblies have different focal lengths, so that at least two images of the M images formed by the light from the M display screens have different image distances. In a case that images are displayed on the M display screens, the observer can see images with different image distances, which avoids vergence-accommodating conflict caused by only viewing images with the same image distance, thereby alleviating eye fatigue and dizziness.

It should be noted that in the drawings, sizes of layers and regions may be exaggerated for clarity of illustration. It should further be understood that in a case that an element or layer is referred to as being "on" another element or layer, it can be directly on the other element or intervening layers may be present. In addition, it should be understood that in a case that an element or layer is referred to as being "under" another element or layer, it can be directly under the other element or layer, or there may be more than one intervening layer or element. In addition, it should further be understood that in a case that a layer or an element is referred to as being "between" two layers or two elements, it can be the only layer between the two layers or two elements, or more than one intervening layer may further be present. Similar reference numerals indicate similar elements throughout.

In the present disclosure, the terms "first" and "second" are used for descriptive purposes only, and cannot be understood as indicating or implying relative importance. The term "plurality" refers to two or more, unless specifically defined otherwise.

One of ordinary skill in the art will easily conceive of other embodiments of the present disclosure after considering the specification and practicing the disclosure disclosed herein. The present disclosure is intended to cover any variations, applications, or modifications of the present disclosure. These variations, applications, or modifications follow the general principles of the present disclosure and include common knowledge or conventional technical means in the technical field that are not disclosed in the present disclosure. The description and the embodiments are to be regarded as exemplary only, and the true scope and spirit of the present disclosure are defined by the appended claims.

It should be understood that the present disclosure is not limited to the exact structure that has been described above and illustrated in the drawings, and various modifications and changes can be made without departing from its scope. The scope of the present disclosure is only defined by the appended claims.

The invention claimed is:

1. A display device comprising:
   an optical waveguide comprising an optical waveguide body and a light outputting section disposed on the optical waveguide body;
   M lens assemblies disposed adjacent to an end of the optical waveguide body, wherein at least two lens assemblies of the M lens assemblies have different focal lengths, and M is a natural number greater than one; and
   M display screens corresponding to the M lens assemblies in one-to-one correspondence, each of the M display screens being configured to emit light with image information through a corresponding lens assembly to the optical waveguide body for transmission;
   wherein the light outputting section is configured to output the light from the M display screens out of the optical waveguide body for imaging, the light from the M display screens forms M images, respectively, and at least two images of the M images have different image distances, and
   wherein the optical waveguide further comprises M coupling sections which are disposed at the end of the optical waveguide body, the M lens assemblies correspond to the M coupling sections in one-to-one correspondence, each of the M lens assemblies is configured to transmit light from a corresponding display screen to a corresponding coupling section, and each of the M coupling sections is configured to couple light from a corresponding display screen into the optical waveguide body at a corresponding incident angle for transmission.

2. The display device according to claim 1 wherein each of the M coupling sections comprises an incident surface, and at least one lens assembly of the M lens assemblies is disposed between the incident surface of its corresponding coupling section and its corresponding display screen.

3. The display device according to claim 2, wherein an orthographic projection of at least one display screen of the M display screens on the incident surface of the corresponding coupling section is within an orthographic projection of its corresponding lens assembly on the incident surface of the corresponding coupling section.

4. The display device according to claim 2, wherein at least one display screen of the M display screens is disposed parallel to an incident surface of its corresponding coupling section.

5. The display device according to claim 2, wherein at least one coupling section of the M coupling sections comprises a reflective surface and an exit surface, the reflective surface is configured to reflect light that is emitted from its corresponding display screen and passes through the incident surface to the exit surface, and the light that is emitted from its corresponding display screen enters the optical waveguide body after exiting the exit surface.

6. The display device according to claim 1, wherein the light outputting section comprises N optical film layers disposed parallel to each other, the N optical film layers are transreflective film layers, wherein N is a positive integer; and the N optical film layers are arranged obliquely with respect to an extending direction of the optical waveguide body; and each of the N optical film layers is configured to reflect a portion of light from each of the M display screens, such that the portion of light exits the optical waveguide body through the light outputting section.

7. The display device according to claim 6, wherein intensities of portions of light emitted from a same display screen, which are reflected by the N optical film layers respectively, are substantially the same.

8. The display device according to claim 1, wherein the light outputting section comprises L optical film layers and a first reflective film layer which are disposed parallel to each other, L is a positive integer, the first reflective film layer is disposed on a side of the L optical film layers away from the end; the L optical film layers are transreflective film layers;

the optical film layer and the first reflective film layer are arranged obliquely with respect to an extension direction of the optical waveguide body, and each of the L optical film layers is configured to reflect a portion of light from each of the M display screens, such that the portion of light exits the optical waveguide through the light outputting section, the first reflective film layer is configured to reflect a portion of light that is emitted from the M display screens and passes through the L optical film layers such that the portion of the light that is emitted from the M display screens and passes through the L optical film layers exits the optical waveguide body through the light outputting section.

9. The display device according to claim 8, wherein intensities of portions of the light that is emitted from a same display screen and reflected by the L optical film layers respectively and by the first reflective layer are substantially the same.

10. The display device according to claim 1, wherein the light outputting section comprises a second reflective film layer; and the second reflective film layer is arranged obliquely with respect to an extension direction of the optical waveguide body; the second reflective film layer is configured to reflect light from each of the M display screens so that the light reflected by the second reflective layers exits the optical waveguide body via the light outputting section.

11. The display device according to claim 1, wherein the optical waveguide body has a shape of sheet.

12. The display device according to claim 1, wherein the light with image information is transmitted through total reflection in the optical waveguide body from the end toward the light outputting section.

* * * * *